(12) United States Patent
Gray et al.

(10) Patent No.: US 10,944,843 B2
(45) Date of Patent: Mar. 9, 2021

(54) TOPOLOGY AWARE COMPUTING DEVICE TO REDUCE NETWORK LATENCY

(71) Applicant: International Business Machines Corporation, Armonk, NY (US)

(72) Inventors: Adam M. Gray, Chicago, IL (US); Manish Motwani, Chicago, IL (US); Ravi V. Khadiwala, Bartlett, IL (US); Jason K. Resch, Chicago, IL (US); Yogesh R. Vedpathak, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/181,171

(22) Filed: Nov. 5, 2018

(65) Prior Publication Data
US 2020/0145511 A1    May 7, 2020

(51) Int. Cl.
*H04L 29/08*    (2006.01)
*H04L 12/24*    (2006.01)
*H04L 12/26*    (2006.01)

(52) U.S. Cl.
CPC .......... *H04L 67/2842* (2013.01); *H04L 41/12* (2013.01); *H04L 43/16* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 6,185,598 B1* | 2/2001 | Farber | G06F 9/505 709/200 |
| 2008/0117824 A1 | 5/2008 | Chakrabarti et al. | |
| 2012/0144065 A1 | 6/2012 | Parker et al. | |
| 2014/0173090 A1 | 6/2014 | Davis | |
| 2014/0280682 A1* | 9/2014 | Grube | G06F 12/1045 709/213 |
| 2014/0289555 A1 | 9/2014 | Grube et al. | |
| 2014/0310491 A1 | 10/2014 | Resch et al. | |
| 2017/0195447 A1* | 7/2017 | Panagos | H04L 67/2842 |
| 2018/0241849 A1* | 8/2018 | Edmiston | H04L 67/42 |

* cited by examiner

*Primary Examiner* — Scott B Christensen
(74) *Attorney, Agent, or Firm* — James Nock; Andrew D. Wright; Roberts Calderon Safran & Cole, P.C.

(57) ABSTRACT

A method includes receiving, by a first computing device, a data access request from a client device, where the first computing device is aware of geographical locations of other computing devices, and where the data access request includes a client geographical location header and a redirection count header. When the redirection count header is higher than a redirection count threshold, the method includes processing the data access request. When the redirection count header is lower than the redirection count threshold, the method includes determining an optimal computing device to process the data access request. When the optimal computing device is geographically closer to the first computing device than the client device, the method includes, proxying the data access request to the optimal computing device. When the optimal computing device is geographically closer to the client device, the method includes sending a redirect response to the client device.

18 Claims, 9 Drawing Sheets

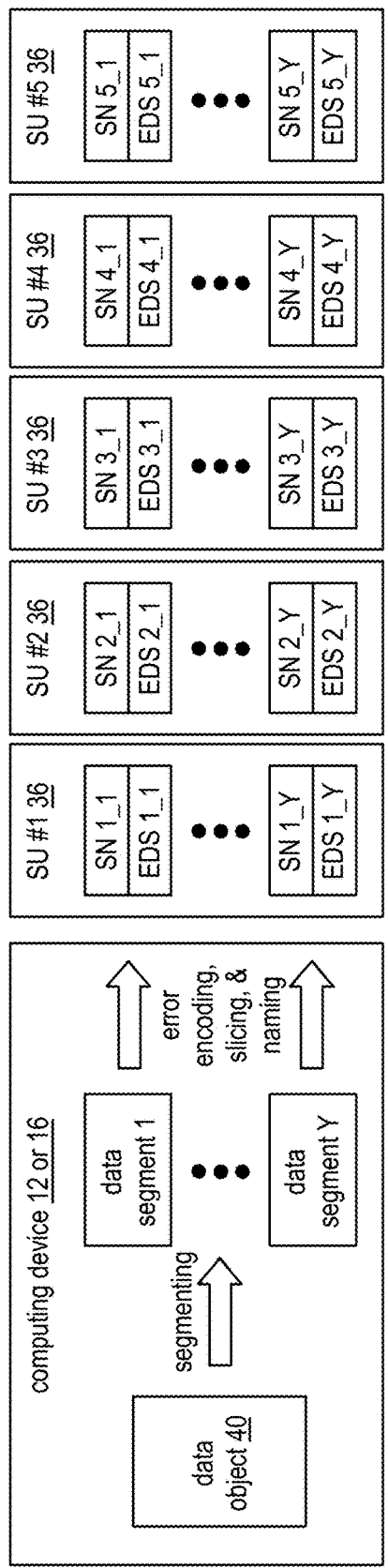
FIG. 3
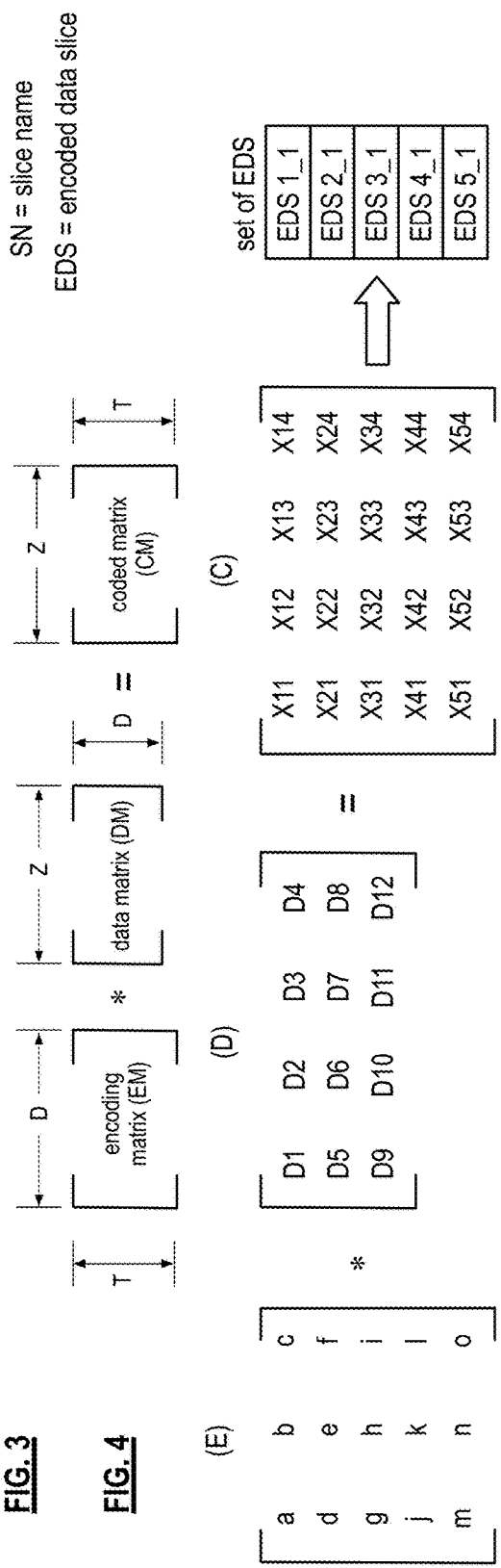
FIG. 4
FIG. 5
FIG. 6

US 10,944,843 B2

TOPOLOGY AWARE COMPUTING DEVICE TO REDUCE NETWORK LATENCY

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

In a dispersed storage network, if two servers that are not geographically close communicate over a wide area network (WAN), the network latency between those servers is high. High network latency results in low throughput.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
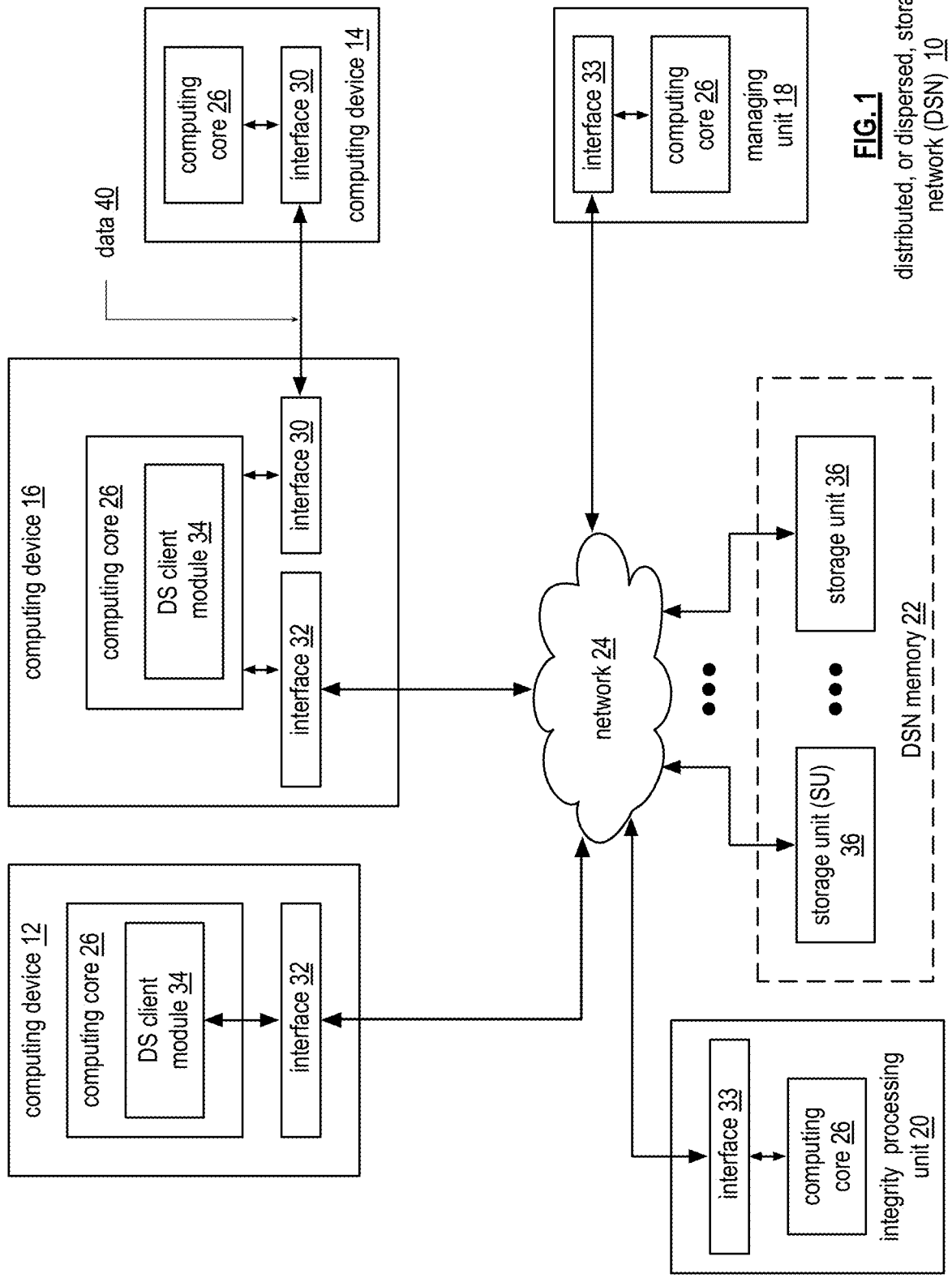
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
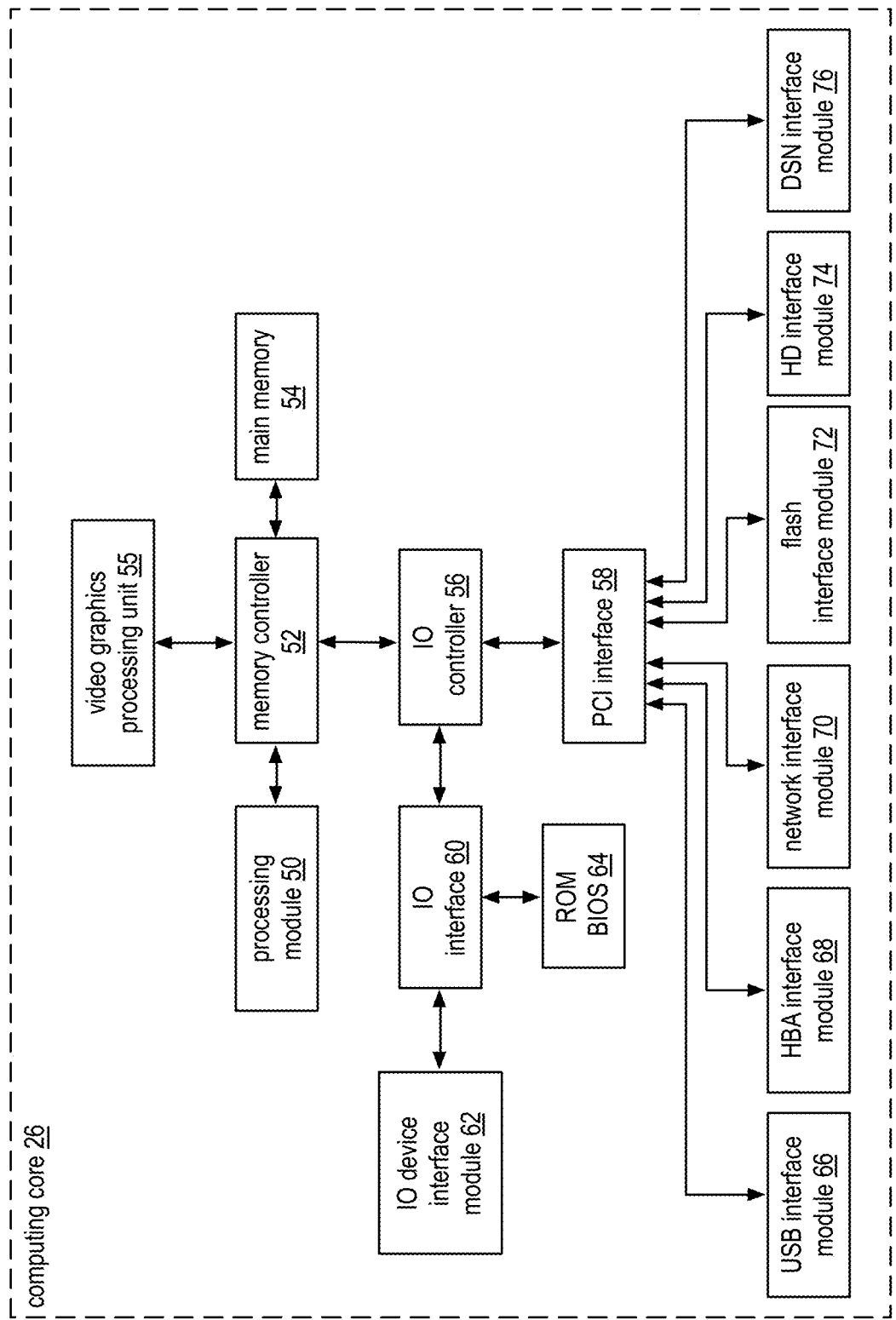
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/ or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
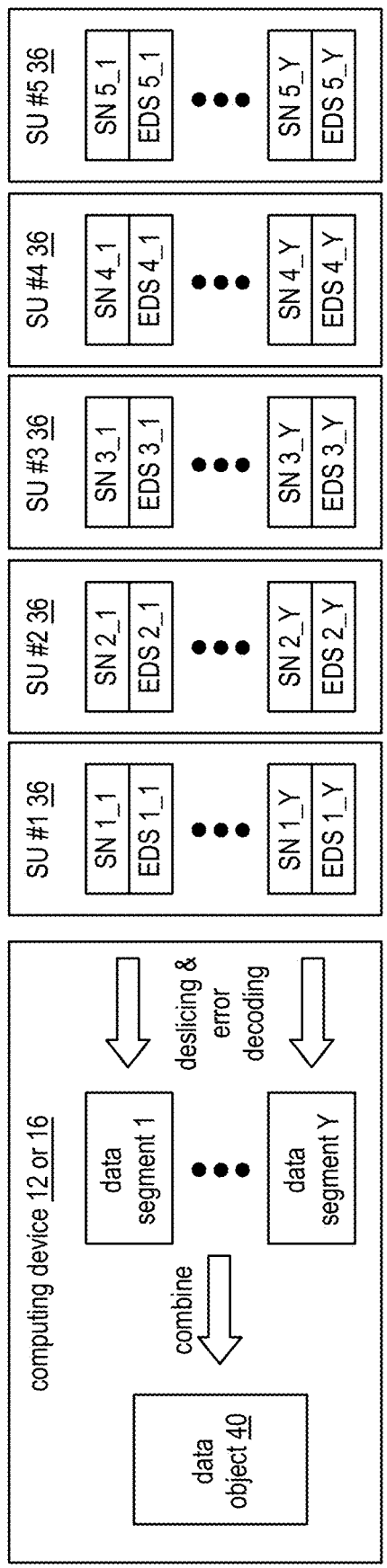
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
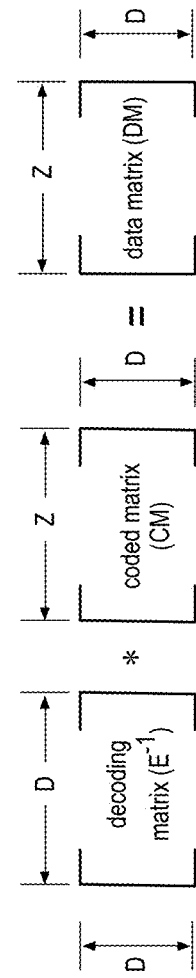
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

FIGS. 9A-9D are a schematic block diagrams of another embodiment of the dispersed or distributed storage network (DSN) that include client device 82, computing devices 1-5, network 24, and storage units #1-5 36. Computing devices 1-5 may be computing devices 12 or 16 of FIG. 1 and each include a dispersed storage (DS) client module 34 enabling them to process data access requests (e.g., dispersed storage error encode and decode data) for clients of the DSN. Client device 82 is operated by one or more users of the DSN. In a DSN, computing devices (e.g., dispersed storage (DS) processing units), client devices, and storage units may be located at geographically different locations (e.g., cities, zip codes, sites, data centers, etc.) and communicate via a wide area network (WAN) (e.g., network 24). In FIGS. 9A-9D, client device 82 is located at geographical location 1, computing devices 1-2 and storage unit #4 are located at geographical location 2, computing device 3 is located at geographical location 3, computing device 4 and storage unit #5 are located at geographical location 4, and storage units #1-3 and computing device 5 are located at geographical location 5. Other computing devices and/or storage units of the DSN may be located at each geographical location.

In a public cloud scenario it is likely that clients are located geographically far from a computing device (i.e., DS processing unit) used to process the client's data access request. In order to compensate for latency issues, computing devices can be deployed closer to the storage units resulting in at least one computing device at each geographical location (e.g., the same site or data center) where storage units are deployed. A client therefore has options as to which computing device to access to process data access requests and a load balancer can be used to direct clients to an appropriate computing device. However, a load balancer introduces a single point of failure and a potential bottleneck. Also, an additional hop is required from the client to the computing device after accessing the load balancer, which is made worse if latency between the client and load balancer is high.

To address this issue, computing devices (i.e., DS processing units) of a DSN are made aware of the relative geographical location of other computing devices of the DSN (i.e., the computing devices are aware of the system's physical/geographical topography). Further, client data access requests include a client location header that indicates the client device's geographical location and a redirection count header that indicates the amount of times a data access request has been redirected back to the client device. Having knowledge of geographical locations as well as the number of data access request redirects allows a computing device to determine the best approach for processing the data access request. As such, clients do not need to worry about communicating to a less than ideal computing device and there is no need for load balancers.

Figure 9A:
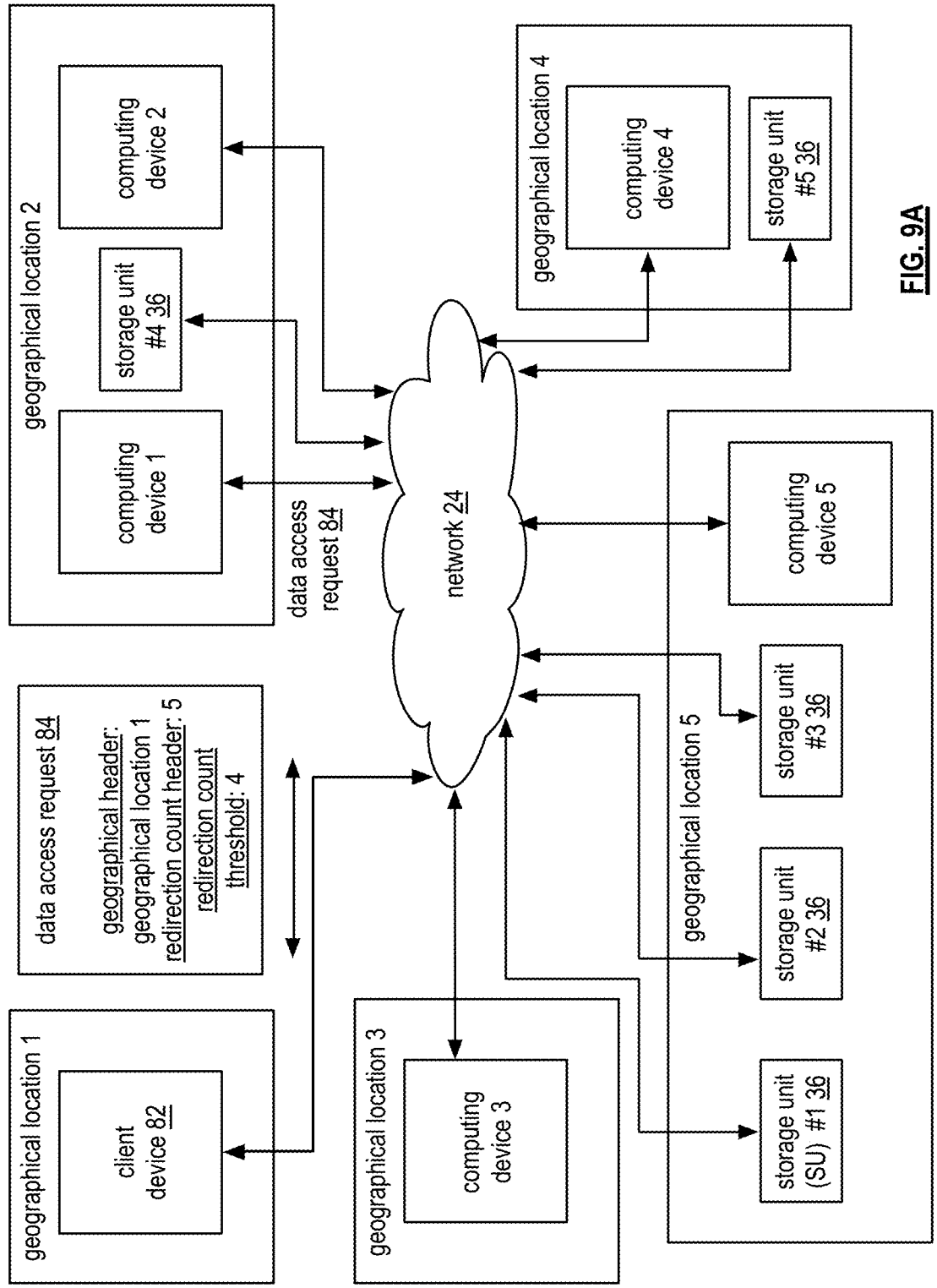
FIGS. 9A-9D are schematic block diagrams of another embodiment of the dispersed or distributed storage network (DSN) in accordance with the present invention.

Referring to the example shown in FIG. 9A, computing device 1 of geographical location 2 receives a data access request 84 from client device 82 located in geographical location 1 via network 24. The data access request 84 includes a client geographical location header ("geographical header") indicating that client device 82 is located in geographical location 1 and a redirection count header. The redirection count header indicates that the data access request has been redirected (i.e., sent from a computing device back to the client device) 5 times. The redirection count threshold is set at 4. The redirection count threshold is a threshold number of data access request redirects allowed by the client device within a time period (e.g., seconds, minutes, days, etc.). When the redirection count header is higher than the redirection count threshold, computing device 1 processes the data access request 84. In this example, the redirection count header is 5 and is therefore higher than the redirection count threshold of 4. As such, computing device 1 processes the data access request 84. While computing device 1 may not be the optimal choice (e.g., lowest latency with the client, highest bandwidth, etc.) to process the data access request 84, the amount of redirects are too high for computing device 1 to proxy the request to a more optimal computing device or send it back to the client device 82 for redirection.

Figure 9B:
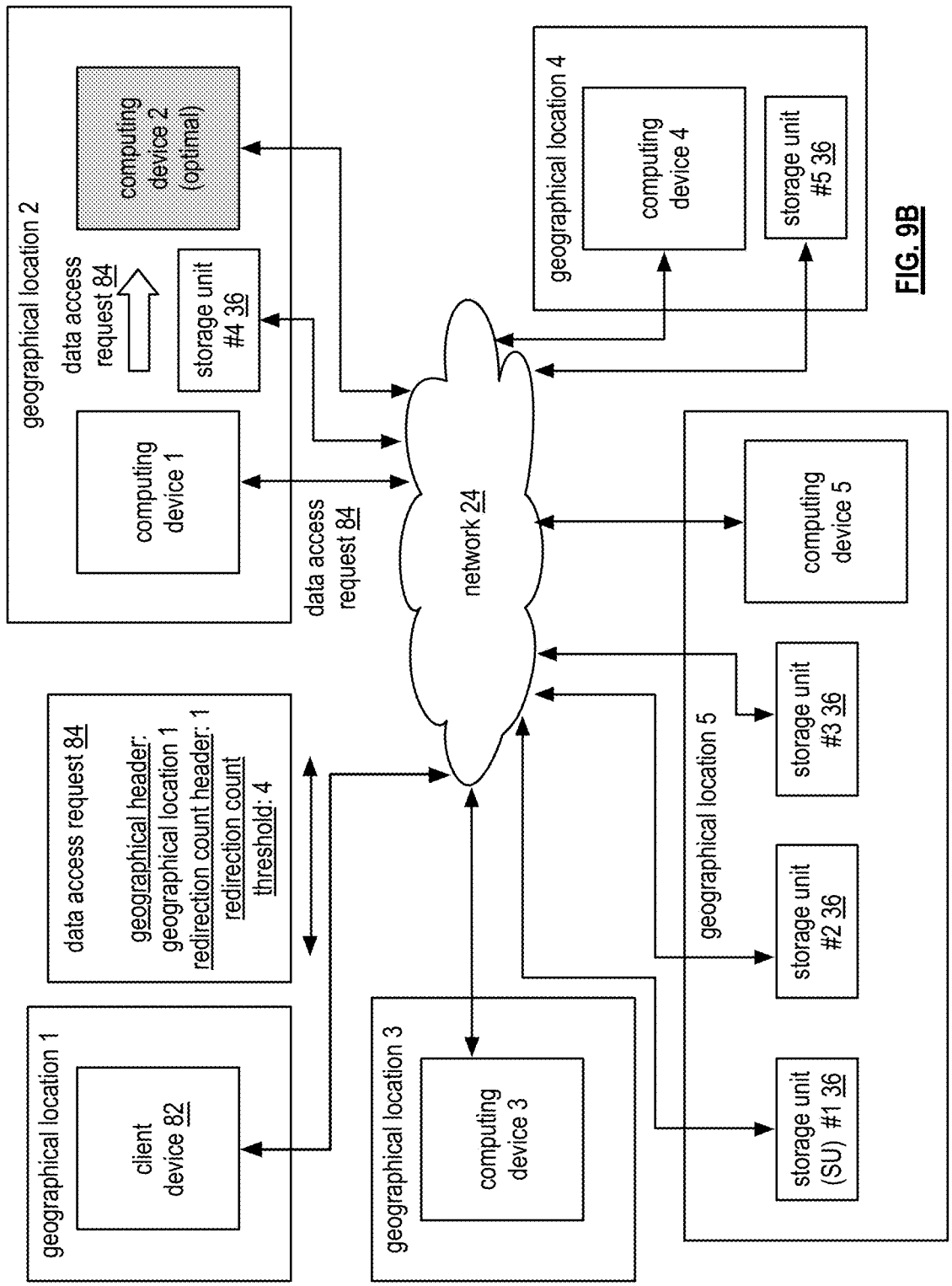

Referring to the example shown in FIG. 9B, computing device 1 of geographical location 2 receives a data access request 84 from client device 82 located in geographical location 1 via network 24. The data access request 84 includes a client geographical location header ("geographical header") indicating that client device 82 is located in geographical location 1 and a redirection count header. The redirection count header indicates that the data access request has been redirected (i.e., sent from a computing device back to the client device) 1 time. The redirection count threshold is set at 4. When the redirection count header is lower than the redirection count threshold, computing device 1 determines an optimal computing device of computing devices 1-5 to process the data access request 84 based on one or more optimization policies.

The one or more optimization policies include one or more of: identifying a computing device having a low latency with the client device 82 as the optimal computing device, identifying a computing device having a higher bandwidth than computing device 1 as the optimal computing device, identifying a computing device having a lower load than computing device 1 at a given time period as the optimal computing device, identifying a computing device geographically close to storage units of the DSN storing data associated with the data access request as the optimal computing device, and identifying a computing device having data associated with the data access request stored in cache as the optimal computing device.

In this example, the redirection count header (1) is less than the redirection count threshold (4), therefore computing device 1 determines an optimal computing device of computing devices 1-5. It is possible for computing device 1 to determine that computing device 1 is the optimal computing device. Here, computing device 1 determines that computing device 2 is the optimal computing device. For example, computing device 2 may have a higher bandwidth than computing device 1. When the optimal computing device is geographically closer to computing device 1 than to the client device 82, computing device 1 proxies the data access request 84 to the optimal computing device. As shown, the optimal computing device (computing device 2) is geographically closer to computing device 1 than to the client device 82. Therefore, computing device 1 proxies data access request 84 to computing device 2 for processing.

Figure 9C:
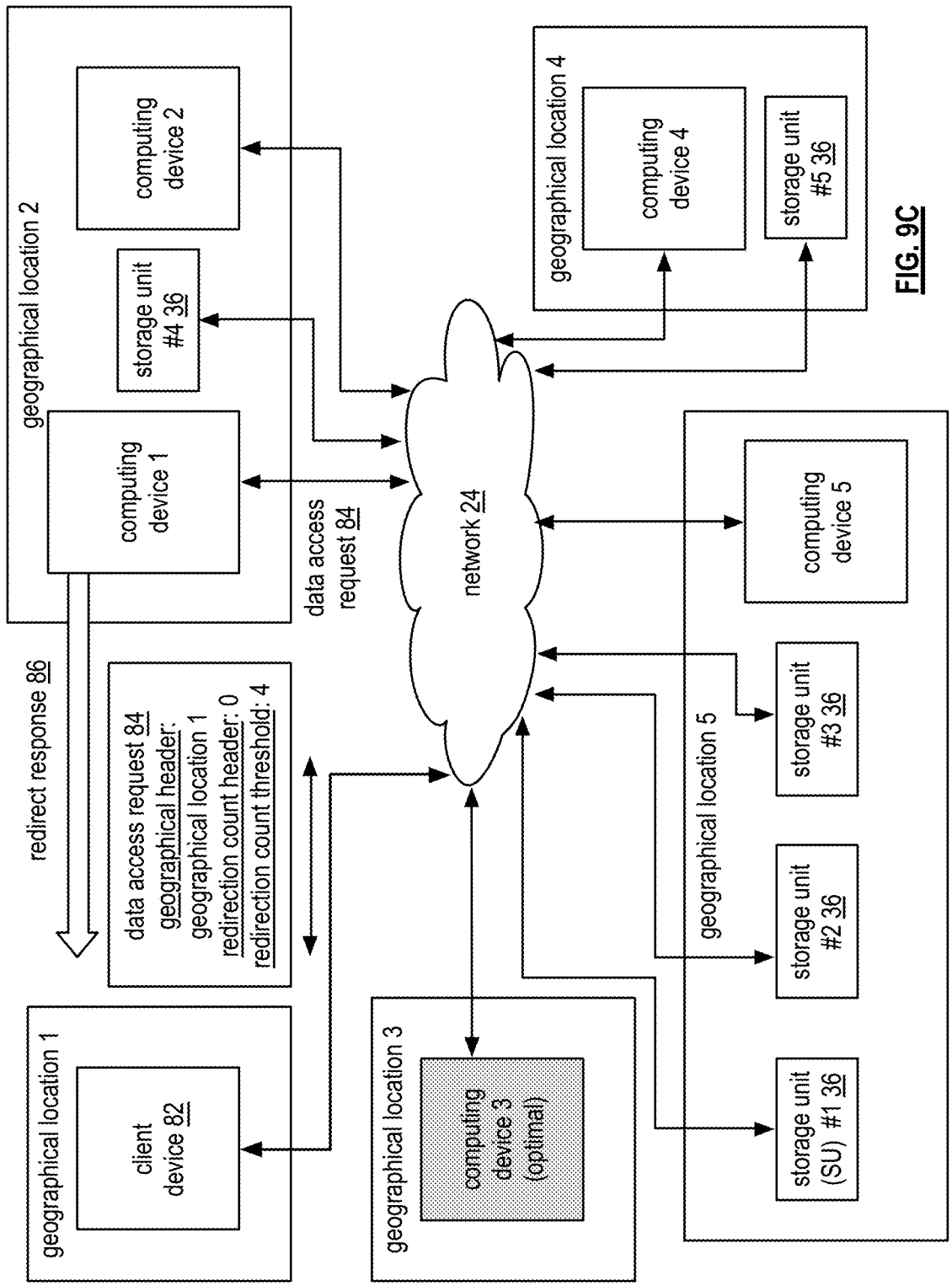

Referring to the example shown in FIG. 9C, computing device 1 of geographical location 2 receives a data access request 84 from client device 82 located in geographical location 1 via network 24. The data access request 84 includes a client geographical location header ("geographical header") indicating that client device 82 is located in geographical location 1 and a redirection count header. The redirection count header indicates that the data access request has not been redirected (i.e., sent from a computing device back to the client device). The redirection count threshold is set at 4. When the redirection count header is lower than the redirection count threshold, computing device 1 determines an optimal computing device of computing devices 1-5 to process the data access request based on one or more optimization policies.

In this example, the redirection count header (0) is less than the redirection count threshold (4), therefore computing device 1 determines an optimal computing device of computing devices 1-5. Here, computing device 1 determines that computing device 3 is the optimal computing device. For example, computing device 3 is geographically close to storage units 1-3 which store a decode threshold amount of data associated with the data access request 84. Further, computing device 3 may also have a low latency with client device 82. When the optimal computing device is geographically closer to client device 82 than computing device 1, computing device 1 sends a redirect response 86 to the client device 82. The redirect response 86 includes an instruction to send the data access request 84 to the optimal computing device (computing device 3). As shown, the optimal computing device (computing device 3) is geographically closer to the client device 82 than to computing device 1. Therefore, computing device 1 sends a redirect response 86 to the client device 82.

Figure 9D:
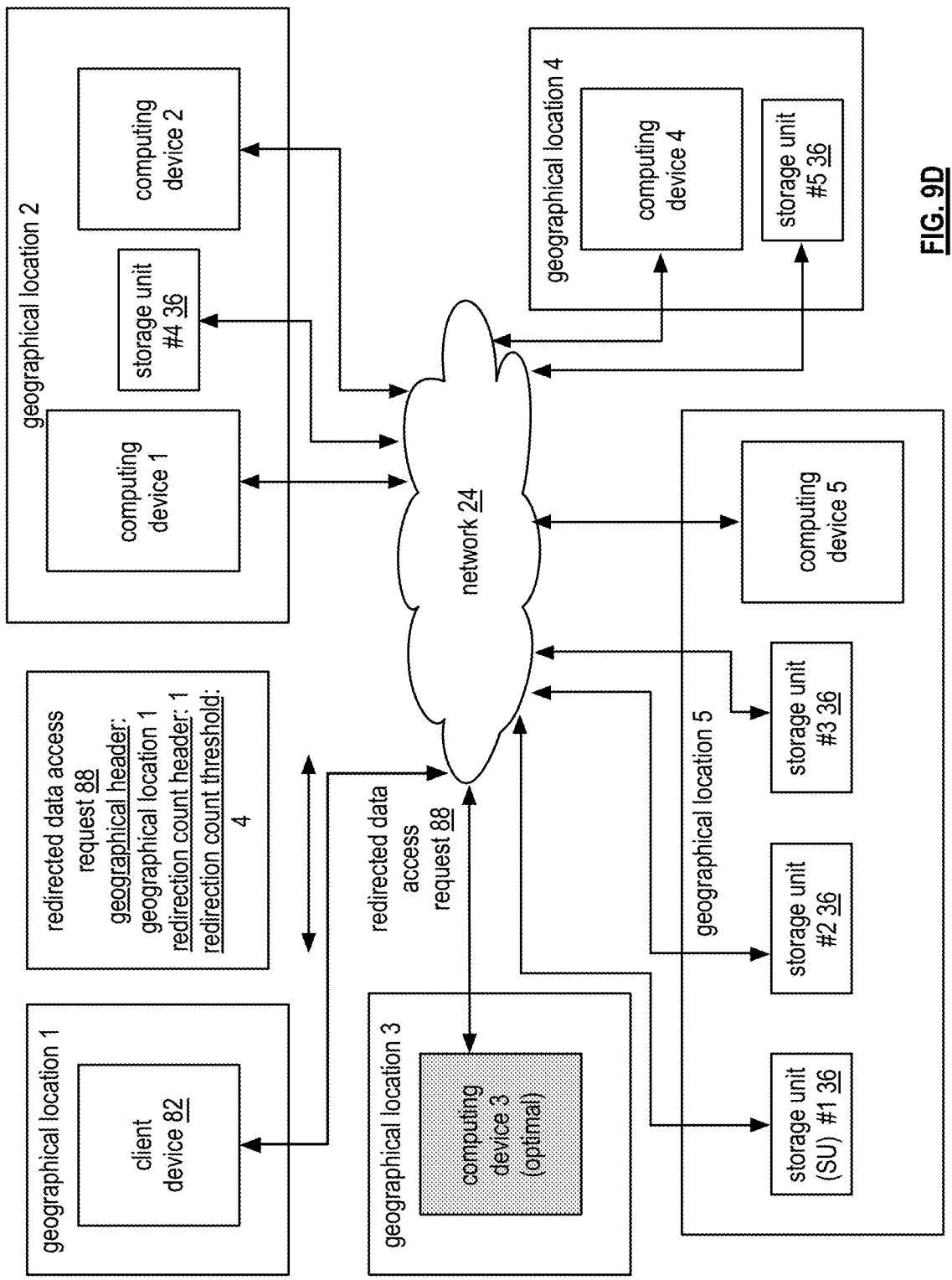

The example shown in FIG. 9D continues the example of FIG. 9C. After determining that computing device 3 is optimal and that computing device 3 is geographically closer to the client device 82, computing device 1 sends a redirect response 86 to the client device 82 (as shown in FIG. 9C). The redirect response 86 may include an instruction to include an incremented redirection count header with the redirected data access request 88. For example, client device 82 generates redirected data access request 88 that includes a geographical header indicating that client device 82 is located in geographical location 1, a redirection count header that indicates the data access request has been redirected one time in accordance with the incremented redirection count header instruction (i.e., the redirection count header previously read as 0), and the redirection count threshold which is set at 4. The client device 82 then sends the redirected data access request to computing device 3 for processing via network 24.

Figure 10:
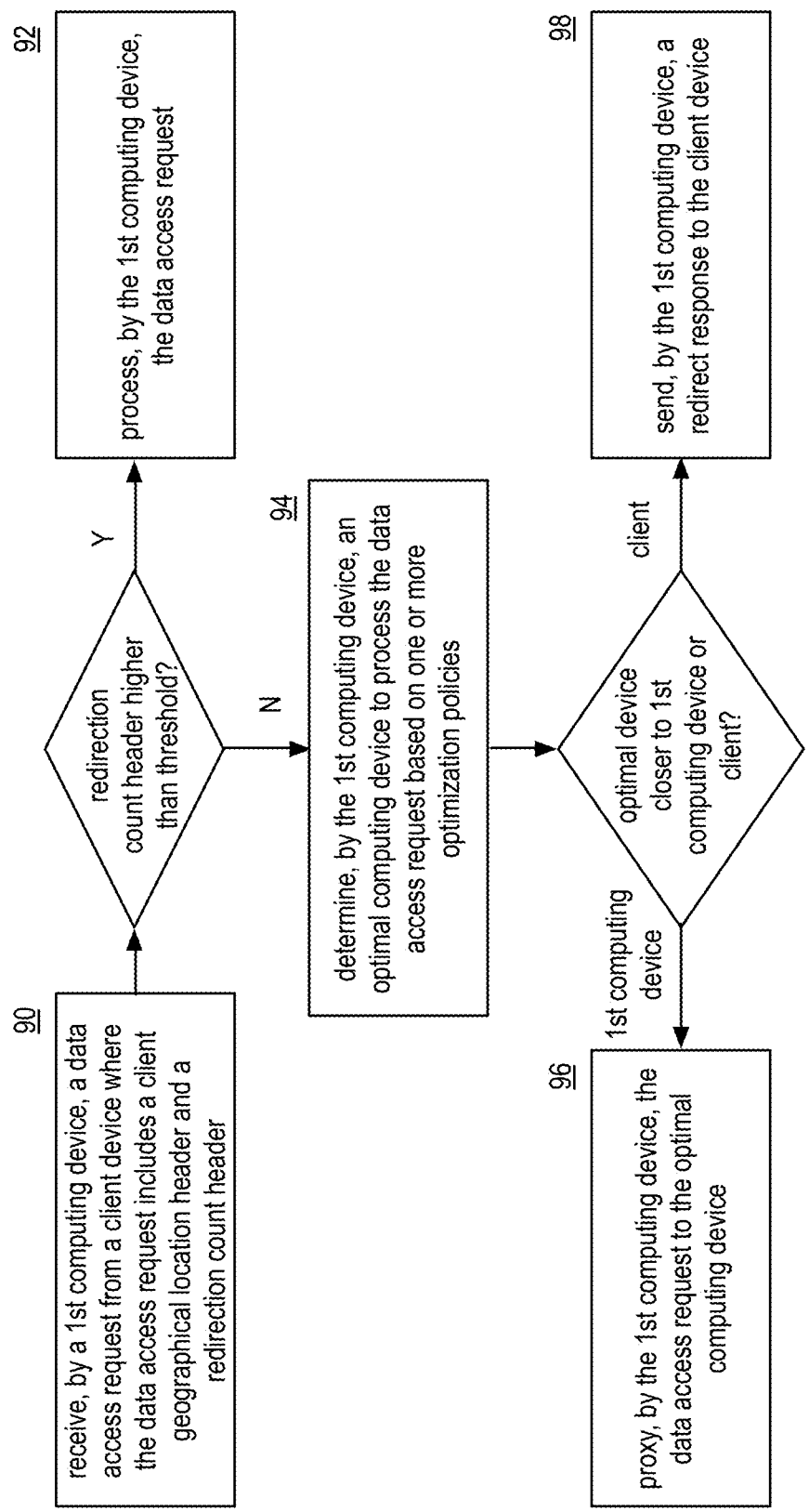
FIG. 10 is a logic diagram of an example of a method of a topology aware computing device to reduce network latency in accordance with the present invention.

FIG. 10 is a logic diagram of an example of a method of a topology aware computing device to reduce network latency in accordance with the present invention. The method begins with step 90 where a first computing device of a plurality of computing devices of a dispersed storage network (DSN) receives a data access request from a client device of the DSN. The first computing device is aware of geographical locations of other computing devices of the plurality of computing devices, and the data access request includes a client geographical location header and a redirection count header.

When the redirection count header is higher than a redirection count threshold, the method continues to step 92. When the redirection count header is not higher than the redirection count threshold, the method continues to step 94. The redirection count threshold is a threshold number of data access request redirects allowed by the client device within a time period (e.g., seconds, minutes, days, etc.). At step 92, when the redirection count header is higher than the redirection count threshold, the first computing device processes the data access request.

At step 94, when the redirection count header is lower than the redirection count threshold, the first computing device determines an optimal computing device of the plurality of computing devices to process the data access request based on one or more optimization policies. The one or more optimization policies includes one or more of identifying a computing device of the plurality of computing devices having a low latency with the client device as the optimal computing device, identifying a computing device having a higher bandwidth than the first computing device as the optimal computing device, identifying a computing device having a lower load than the first computing device at a given time period as the optimal computing device, identifying a computing device geographically close to storage units of the DSN storing data associated with the data access request as the optimal computing device, and identifying a computing device having data associated with the data access request stored in cache as the optimal computing device. The first computing device may determine that the first computing device is the optimal computing device.

When the optimal computing device is geographically closer to the first computing device than the client device, the method continues to step 96 where the first computing device proxies the data access request to the optimal computing device. When the optimal computing device is geographically closer to the client device than the first computing device, the method continues to step 98 where the first computing device sends a redirect response to the client device. The redirect response includes an instruction to send the data access request to the optimal computing device. The redirect response may further include an instruction to include an incremented redirection count header with the redirected data access request.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
receiving, by a first computing device of a plurality of computing devices of a dispersed storage network (DSN), a data access request from a client device of the DSN, wherein the first computing device is aware of geographical locations of other computing devices of the plurality of computing devices, and wherein the data access request includes a client geographical location header that specifies a geographic location of the client device and a redirection count header that indicates an amount of times the data access request has been redirected back to the client device; and
determining, by the first computing device, that the redirection count is higher or lower than a redirection count threshold, wherein the first computing device is configured to:
responsive to the redirection count header being higher than the redirection count threshold, process the data access request; and
responsive to the redirection count header being lower than the redirection count threshold:
determine an optimal computing device of the plurality of computing devices to process the data access request based on one or more optimization policies; and
determine whether the determined optimal computing device is geographically closer to the first computing device than the client device or whether the determined optimal computing device is geographically closer to the client device than the first computing device, wherein the first computing device is configured to:
responsive to the optimal computing device being geographically closer to the first computing device than the client device,
proxy the data access request to the optimal computing device; and
responsive to the optimal computing device being geographically closer to the client device than the first computing device,
send a redirect response to the client device, wherein the redirect response includes an instruction to send the data access request to the optimal computing device.

2. The method of claim 1, wherein the one or more optimization policies are selected from a group of stored optimization policies comprising:

identifying, by the first computing device, a computing device of the plurality of computing devices having a low latency with the client device as the optimal computing device;
identifying, by the first computing device, a computing device having a higher bandwidth than the first computing device as the optimal computing device;
identifying, by the first computing device, a computing device having a lower load than the first computing device at a given time period as the optimal computing device;
identifying, by the first computing device, a computing device geographically close to storage units of the DSN storing data associated with the data access request as the optimal computing device; and
identifying, by the first computing device, a computing device having data associated with the data access request stored in cache as the optimal computing device.

3. The method of claim 1, wherein in cases where the first computing device determines that the optimal computing device of the plurality of computing devices is the first computing device, the first computing device is configured to process the data request.

4. The method of claim 1, wherein the redirect response includes an instruction to include an incremented redirection count header with the redirected data access request.

5. The method of claim 1, wherein the redirection count threshold is a threshold number of data access request redirects allowed by the client device within a time period.

6. The method of claim 1, wherein the optimal computing device is determined based on the optimal computing device having a lower latency with the client device compared with others of the plurality of computing devices.

7. The method of claim 1, wherein the optimal computing device is determined based on the optimal computing device having a higher bandwidth than others of the plurality of computing devices.

8. The method of claim 1, wherein the optimal computing device is determined based on the optimal computing device having a lower load at a given time period than others of the plurality of computing devices.

9. The method of claim 1, wherein the optimal computing device is determined based on the optimal computing device being geographically closer to storage units of the DSN storing data associated with the data access request than others of the plurality of computing devices.

10. The method of claim 1, wherein the optimal computing device is determined based on the optimal computing device having data associated with the data access request stored in a cache.

11. The method of claim 1, wherein the optimal computing device is determined based on one selected from the group consisting of: one of the plurality of computing device having a lower latency with the client device compared with others of the plurality of computing devices; one of the plurality of computing devices having a higher bandwidth than others of the plurality of computing devices; and one of the plurality of computing devices having a lower load at a given time period than others of the plurality of computing devices.

12. The method of claim 1, wherein the optimal computing device is determined based on the optimal computing device being geographically closer to storage units of the DSN storing data associated with the data access request than others of the plurality of computing devices.

13. The method of claim 1, wherein the optimal computing device is determined based on the optimal computing device having data associated with the data access request stored in a cache.

14. A first computing device of a plurality of computing devices of a dispersed storage network (DSN), the first computing device comprises:
an interface;
memory; and
a processing module operably coupled to the memory and the interface, wherein the processing module is operable to:
receive a data access request from a client device of the DSN, wherein the first computing device is aware of geographical locations of other computing devices of the plurality of computing devices, and wherein the data access request includes a client geographical location header that specifies a geographic location of the client device and a redirection count header that indicates an amount of times the data access request has been redirected back to the client device; and
determine whether the redirection count is higher or lower than a redirection count threshold, wherein:
when the redirection count header is higher than a redirection count threshold, process the data access request; and
when the redirection count header is lower than the redirection count threshold:
determine an optimal computing device of the plurality of computing devices to process the data access request based on one or more optimization policies; and
determine whether the determined optimal computing device is geographically closer to the first computing device than the client device or whether the determined optimal computing device is geographically closer to the client device than the first computing device, wherein:
when the optimal computing device is geographically closer to the first computing device than the client device, proxy the data access request to the optimal computing device; and
when the optimal computing device is geographically closer to the client device than the first computing device, send a redirect response to the client device, wherein the redirect response includes an instruction to send the data access request to the optimal computing device.

15. The first computing device of claim 14, wherein the one or more optimization policies are selected from a group of stored optimization policies comprising:
identifying a computing device of the plurality of computing devices having a low latency with the client device as the optimal computing device;
identifying a computing device having a higher bandwidth than the first computing device as the optimal computing device;
identifying a computing device having a lower load than the first computing device at a given time period as the optimal computing device;
identifying a computing device geographically close to storage units of the DSN storing data associated with the data access request as the optimal computing device; and
identifying a computing device having data associated with the data access request stored in cache as the optimal computing device.

16. The first computing device of claim 14, wherein in cases where computing devices is the first computing device, the first computing device is configured to process the data request.

17. The first computing device of claim 14, wherein the redirect response includes an instruction to include an incremented redirection count header with the redirected data access request.

18. The first computing device of claim 14, wherein the redirection count threshold is a threshold number of data access request redirects allowed by the client device within a time period.

* * * * *